United States Patent Office 2,805,578
Patented Sept. 10, 1957

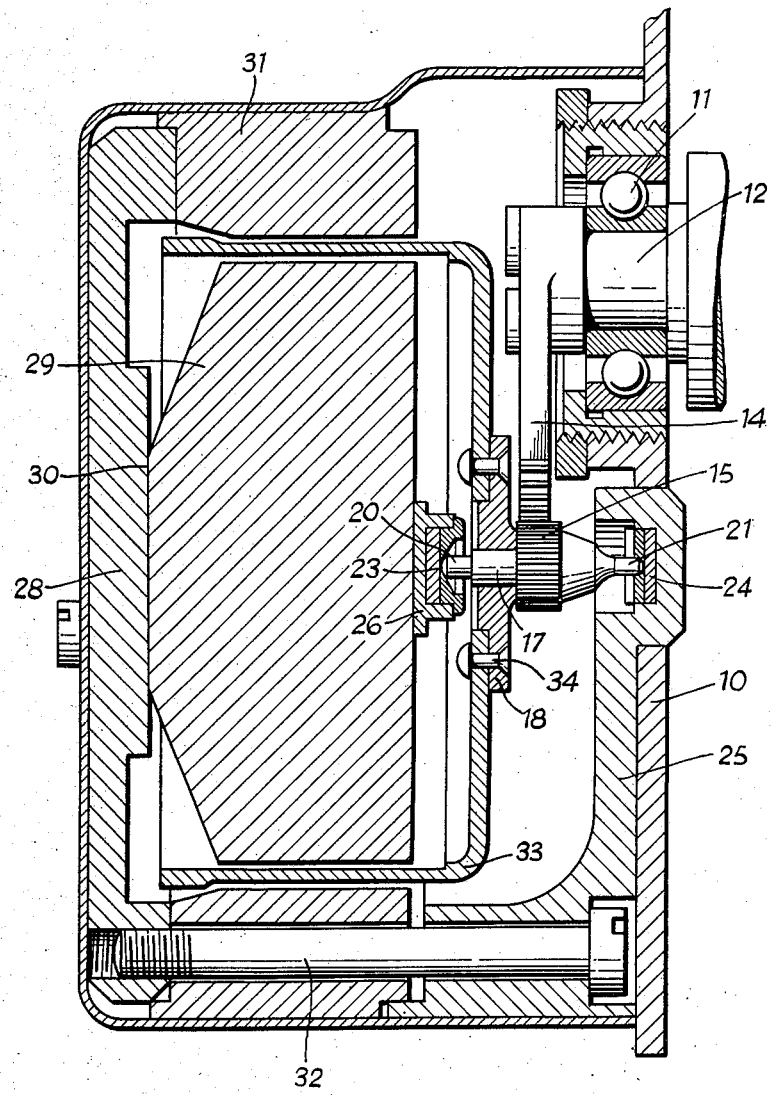

2,805,578

TURN AND SLIP INDICATOR INSTRUMENTS

Gordon Percy Wright, Hillington, Glasgow, Scotland, assignor to Kelvin & Hughes Limited, Hillington, Glasgow, Scotland Application July 24, 1953, Serial No. 370,001

Claims priority, application Great Britain March 23, 1953

10 Claims. (Cl. 74—5.5)

This invention relates to gyroscopic turn and slip indicator instruments, and in particular to the turn unit, having a rate gyroscope operating a turn indicator on the dial of the instrument. These instruments have the well known disadvantage that the turn indicator devices oscillate unduly thereby making an accurate reading difficult, if not impossible. Moreover, it has been found that under certain conditions of flight considerable instability of the indicator devices may occur. It is known to apply air damping to the gimbal rings of such gyroscopes by a dashpot type device, but this has not proved to be completely effective and may be affected by dust particles and change of altitude.

I have now found that magnetic damping can be applied to these instruments sufficient to achieve freedom from oscillation and instability of the indicator devices.

According to the present invention the instrument comprises a gyroscopic turn indicator having a gyroscopic rotor, a gimbal ring carrying the rotor, a rotatable copper cup geared to said gimbal ring giving increased angular speed of the cup in relation to the gimbal ring, and a fixed permanent magnet of high coercivity within said copper cup with a soft iron ring surrounding the cup to complete the magnetic circuit.

Induced currents are generated in the cup creating a torque in opposition to that of the gyroscope gimbal and thereby damping that motion of the gimbal. The damping effect is a function of the speed of gimbal movement.

I have found that if a compact permanent magnet is selected of high coercivity (such as known by the trademarks Ticonal and Alcomax) and of sufficient mass, with a deeper copper cup and step-up gearing, a sufficient degree of damping can be achieved without such overall bulk as would render the damping device impracticable. It is particularly desirable to make the magnet of compact shape and for this purpose I prefer to avoid using an annular magnet, but use one having no central hole therethrough. I also prefer to use a deep shape of magnet and cup for which purpose their depth should desirably be at least one third (e. g. 40 to 60 percent) of their diameters. The cup may be supported in jewel bearings and one of these may be carried by a support that is mounted on the magnet by an adhesive cement. The magnet also may be mounted on the frame by adhesive cement. The cement may be of a resinous type such as is known by the trademark "Araldite."

The invention will now be described by way of example with reference to the accompanying diagrammatic drawing which is a sectional view through part of an instrument made in accordance with the invention.

A wall 10 comprising part of the frame of the instrument carries a ball bearing 11 in which one of the gimbal pivots 12 is pivotally mounted. This pivot 12 carries a toothed quadrant 14 which meshes with a pinion 15 thereby providing a step-up ratio to the pinion. The pinion 15 is carried on a spindle 17 and has a boss on which is fixed a plate 18. The spindle has end pintles 20, 21 which are mounted in jewel bearings 23, 24, the latter being supported in a recess in a front cup 25 and the former being carried in a housing 26.

A plate 28 has a permanent magnet 29 cemented to it by adhesive cement at 30. A soft iron ring 31 completes the magnetic circuit. The front cup, soft iron ring and plate are clamped together by three screws, of which one is shown at 32. The permanent magnet is of deep section and without a central opening so as to be compact and yet provide high flux density in an air gap between the magnet and the soft iron ring. An annular wall of a deep thin walled copper cup 33 is rotatable in the air gap, this cup being fixed to the aforesaid plate 18 by rivets 34.

As the gimbal spindle rotates, the quadrant drives the copper cup at higher speed through the pinion whereby induced currents are set up in the copper cup thereby producing the required damping torque.

It will be noted in the figure that the end of the magnet 29 adjacent the open end of cup 33 is chamfered so that the cup 33 extends beyond the effective field path. This portion of the cup 33 is also shown with a thickened wall portion. These two points of construction promote the flow of eddy currents and the build-up of the braking field which opposes movement of the cup 33, yielding an improved result.

While there has been described above what is at present believed to be the preferred form of this invention, it will be understood that various changes may be made therein by those skilled in the art without departing from the spirit of the invention. All such variations which fall within the true spirit of the invention are intended to be included in the appended claims in which generic terms have been employed to include all such variations and equivalent structures.

I claim:

1. A gyroscopic turn indicator having a gyroscopic rotor, a gimbal ring carrying the said rotor, a rotatable copper cup coupled to said gimbal ring via a gear mechanism, said gear mechanism serving to give an increased angular speed to the said cup in relation to the angular speed of said gimbal ring, a permanent magnet of high coercivity having an end portion of reduced cross-section fixedly mounted within said copper cup, and a soft iron ring surrounding the said cup to complete the magnetic circuit, said cup extending outside the effective part of said magnetic circuit and over said portion of reduced cross-section.

2. An indicator as claimed in claim 1 wherein the said permanent magnet is free from any aperture through its central part, the thickness of said magnet being more than one-third of its diameter, and the depth of the annular wall of the said cup being also more than one-third of its diameter.

3. A gyroscopic turn indicator having a gyroscopic rotor, a gimbal ring carrying the said rotor, a rotatable copper cup coupled to said gimbal ring via a gear mechanism, said gear mechanism serving to give an increased angular speed to the said cup in relation to the angular speed of said gimbal ring, a permanent magnet of high coercivity fixedly mounted within said copper cup, and a soft iron ring surrounding the said cup to complete the magnetic circuit wherein the said cup is rotatably mounted in a bearing, said bearing being carried by a support attached to the said magnet.

4. A gyroscopic turn indicator having a gyroscopic rotor, a gimbal ring carrying the said rotor, a rotatable copper cup coupled to said gimbal ring via a gear mechanism, said gear mechanism serving to give an increased angular speed to the said cup in relation to the angular speed of said gimbal ring, a permanent magnet of high coercivity fixedly mounted within said copper cup, and a soft iron ring surrounding the said cup to complete the magnetic circuit wherein the said magnet is carried by means of an adhesive cement upon a support member, said support member being mounted adjacent said rotatable cup and in close proximity to said soft iron ring.

5. A damping device for gyroscopes comprising a gyroscopic rotor operatively carried by a gimbal ring, said gimbal ring including a trunnion pivotally mounted in a structural frame, an electrically conductive cup rotatably mounted adjacent said trunnion of said gimbal ring, said cup being operatively connected to said trunnion by gear means interposed between the said cup and the said trunnion, and a permanent magnet disposed within the said cup and fixedly mounted with respect to said structural frame, said cup extending beyond the effective field produced by said magnet to maximize the damping effect.

6. The damping device of claim 5 in which said gear means comprises a toothed quadrant attached to said trunnion, said quadrant meshing with a pinion attached to said cup.

7. The damping device of claim 5 wherein said permanent magnet is imperforate and compact and is itself directly attached to a supporting plate by an integral part of reduced cross-section to limit the effective field to a portion only of said cup, and a soft iron ring surrounding said cup and in close proximity to said supporting plate and to said cup.

8. A gyroscopic device comprising a gyroscopic rotor operatively carried by a gimbal ring, said gimbal ring being pivotally mounted in a structural frame by means of a trunnion, a copper cup rotatably mounted adjacent said trunnion by means of a spindle, a permanent magnet disposed within said copper cup and fixedly mounted with respect to said structural frame, said magnet including bearing means for supporting one end of the said spindle, the other end of said spindle being mounted in further bearing means adjacent said trunnion, and gear means comprising a toothed quadrant and a pinion mechanically interposed between said trunnion and said spindle.

9. The device of claim 8 in which said magnet is substantially cylindrical in configuration, the depth of said magnet being at least one-third the diameter thereof, and a soft iron ring surrounding said copper cup and in close proximity to said magnet, whereby said copper cup is substantially entirely disposed between an internal annular surface of said soft iron ring and the external peripheral surface of said substantially cylindrical magnet.

10. The combination set forth in claim 5, that portion of said cup extending beyond said effective field having a thickened annular wall portion whereby to increase eddy current flow.

References Cited in the file of this patent

UNITED STATES PATENTS

| | | |
|---|---|---|
| 1,642,087 | Rosenbaum | Sept. 13, 1927 |
| 2,299,663 | Tilstone et al. | Oct. 20, 1942 |
| 2,419,063 | Fischer | Apr. 15, 1947 |
| 2,537,844 | Meredith | Jan. 9, 1951 |

FOREIGN PATENTS

| | | |
|---|---|---|
| 124,508 | Australia | June 5, 1947 |
| 597,188 | Great Britain | Jan. 20, 1948 |